United States Patent [19]

Mesick et al.

[11] 4,355,224

[45] Oct. 19, 1982

[54] COATED ELECTRODE

[75] Inventors: Jack H. Mesick; Lewis E. Shoemaker; Richard F. Freeman, all of Huntington, W. Va.

[73] Assignee: Huntington Alloys, Inc., Huntington, W. Va.

[21] Appl. No.: 178,497

[22] Filed: Aug. 15, 1980

[51] Int. Cl.³ .............................................. B23K 35/30
[52] U.S. Cl. ........................ 219/137 WM; 219/146.23
[58] Field of Search ...................... 219/146.23, 145.23, 219/137 WM

[56] References Cited

U.S. PATENT DOCUMENTS

| | | | |
|---|---|---|---|
| 2,798,824 | 7/1957 | Grand | 117/206 |
| 3,024,137 | 3/1962 | Witherell | 219/146.23 |
| 3,124,479 | 3/1964 | Witherell | 219/146.23 X |
| 3,184,577 | 5/1965 | Witherell | 219/137 WM |
| 3,243,285 | 3/1966 | Fragetta | 219/145.23 X |
| 3,859,060 | 1/1975 | Eiselstein | 29/193 |
| 4,041,274 | 8/1977 | Sadowski | 219/146.23 X |
| 4,149,063 | 4/1979 | Bishel | 219/146.23 |

FOREIGN PATENT DOCUMENTS

| | | | |
|---|---|---|---|
| 470193 | 12/1950 | Canada | 219/137 WM |
| 539728 | 1/1977 | U.S.S.R. | 219/146.23 |

*Primary Examiner*—Richard R. Kucia
*Attorney, Agent, or Firm*—Raymond J. Kenny; Edward A. Steen

[57] ABSTRACT

A coated electrode having a flux formulation that is a function of the diameter of the electrode wire. The electrode wire is made from a nickel-chromium-cobalt-molybdenum-aluminum alloy. The flux coating contains differing amounts of manganese, iron and columbium depending on the diameter of the core wire.

8 Claims, No Drawings

COATED ELECTRODE

TECHNICAL FIELD

This invention relates to the art of welding in general and more particularly to a coated welding electrode especially adapted for nickel based alloy welding.

BACKGROUND ART

Nickel base alloys have long enjoyed considerable usage as structural materials and have been found to be particularly advantageous when employed in high temperature environments such as those associated with nuclear reactors, jet engines and the like. These nickel alloys exhibit excellent high temperature strength characteristics as well as high resistance to the fluctuating stresses and shock experienced at elevated temperatures. Moreover, many nickel base alloys are highly resistant to corrosion normally associated with a wide variety of hot gases and corrosive liquids.

In particular, the assignee of this invention, produces a patented solid-solution nickel-chromium-cobalt-molybdenum-aluminum alloy called INCONEL alloy 617. (INCONEL is a trademark of Huntington Alloys, Inc. Huntington, W. Va.). See U.S. Pat. No. 3,859,060. This alloy exhibits an excellent combination of high temperature strength and oxidation resistance characteristics. INCONEL alloy 617 also has excellent resistance to a wide range of corrosive environments and it is readily formed and welded by conventional techniques.

Inasmuch as this alloy (as well as other alloys) is ultimately joined to something, we attempted to develop a welding electrode using the alloy itself as the core wire. Accordingly, we initially employed standard production INCONEL alloy 617 as the core wire for the electrode. In this manner, the problems of introducing and producing a new and different electrode solely for welding electrodes were to be eliminated.

Our goal was to develop a welding electrode having a deposit that exhibited the same tensile stress, rupture and oxidation properties as those of the wrought alloy product. Moreover, it was expected that the electrode would exhibit good operability and produce sound weldments.

Initially, it was determined that such an electrode could be produced. However, as developmental work proceeded, it was discovered that an exact duplication of the alloy composition when used in electrode form did not produce defect-free weldments when the electrode was used out of position. Indeed, close examinations of the resulting deposit disclosed evidence of undesirable microfissuring. Since this problem occurs more often than not, an electrode capable of producing defect-free weldments had to be developed.

SUMMARY OF THE INVENTION

There is provided a coated electrode having two slightly dissimilar flux formations; the composition of the flux coating being a function of the diameter of the core wire.

As was discussed previously, the core wire is made from a nickel-chromium-cobalt-molybdenum-aluminum alloy. The flux composition is similar to but not identical to the composition of the core wire. In particular, the percentage of two elements included in the flux, manganese and columbium, is adjusted to reflect the diameter of the core wire. The smaller diameter electrode will have a correspondingly higher percentage of manganese and columbium to combat the debilitating effects of microfissuring.

PREFERRED MODE FOR CARRYING OUT THE INVENTION

Broadly stated, the present invention contemplates the provision of a flux-coated welding rod having a core wire of a nickel base alloy and in combination therewith a special flux coating containing controlled amounts of columbium (niobium) and manganese. An important feature of the present invention is that the coated welding rod contains controlled amounts of columbium and manganese in a special balance with the other constituents of the coated welding rod together with a special control of aluminum in the core wire to produce an arc welding electrode having good arc behavior, slagging characteristics and resistance to hot weld cracking. In general, the columbium and manganese is present partly in the flux and partly in the core. The columbium may be replaced in part by tantalum. Indeed, most commercial sources of columbium usually contain tantalum.

The nominal chemical composition of the nickel base alloy welding wire (INCONEL alloy 617) is given in Table 1.

TABLE 1

| (% by weight) | |
| --- | --- |
| Nickel | 52.0 |
| Chromium | 22.0 |
| Cobalt | 12.5 |
| Molybdenum | 9.0 |
| Aluminum | 1.2 |
| Carbon | 0.07 |
| Iron | 1.5 |
| Manganese | 0.5 |
| Silicon | 0.5 |
| Sulfur | 0.008 |
| Titanium | 0.3 |
| Copper | 0.2 |

It was found that it was possible to produce an electrode that met the requirements discussed above. A first deposit composition developed is that given in Table 2 for 5/32" (0.41 cm) and 3/16" (0.48 cm) diameter electrodes. However, later we found that this composition was not capable of producing defect-free weldments when used out of position. To remedy this situation columbium and higher levels of manganese were added to the deposit (via the flux coating) of the smaller diameter electrodes (3/32" [0.23 cm] and ⅛" [0.32 cm]—sizes that may ordinarily be used out of position). Thus, it was necessary to produce two slightly dissimilar flux formulations, one for the larger diameter electrodes and another with a higher manganese and columbian content for the smaller diameters.

The chemical analyses of deposits of the four sizes of electrodes are presented in Table 2. As can be seen, the difference in the larger and smaller sizes is in the levels of manganese and columbium. Iron content also differs because the columbium is added in the form of ferrocolumbium. Otherwise, the composition of the deposits are quite similar.

TABLE 2

| AVERAGE CHEMICAL ANALYSIS - WELDING ELECTRODE DEPOSIT (IN WEIGHT PERCENT) | | |
| --- | --- | --- |
| Element | 3/32"(.24 cm) and ⅛"(.32 cm) | 5/32"(.41 cm) and 3/16"(.48 cm) |
| Carbon (C) | .1 | .1 |

TABLE 2-continued
AVERAGE CHEMICAL ANALYSIS - WELDING ELECTRODE DEPOSIT (IN WEIGHT PERCENT)

| Element | | 3/32"(.24 cm) and 1/8"(.32 cm) | 5/32"(.41 cm) and 3/16"(.48 cm) |
|---|---|---|---|
| Manganese | (Mn) | 1.42 | .64 |
| Iron | (Fe) | 1.16 | .87 |
| Sulfur | (S) | .005 | .004 |
| Silicon | (Si) | .5 | .47 |
| Copper | (Cu) | .05 | .05 |
| Nickel | (Ni) | Bal | Bal |
| Chrome | (Cr) | 23.1 | 23.20 |
| Aluminum | (Al) | .21 | .24 |
| Titanium | (Ti) | .09 | .13 |
| Magnesium | (Mg) | <.001 | <.001 |
| Cobalt | (Co) | 11.47 | 11.73 |
| Molybdenum | (Mo) | 9.24 | 9.32 |
| Columbium-Tantalum | (Cb + Ta) | .52 | .02 |
| Boron | (B) | <.002 | .001 |
| Phosphorous | (P) | .005 | .004 |

A silicate type binder is used with the flux composition to provide a durable and hard coating after drying and baking. This silicate type binder may be a solution of sodium silicate and/or potassium silicate. A preferred binder formulation is given in Table 3.

TABLE 3
BINDER FORMULATION

| | Range | |
|---|---|---|
| Ingredient | Broad (%) | Preferred (%) |
| Sodium Silicate | 40–98 | 95 |
| Potassium Silicate | 0–50 | |
| Lithium Silicate | 0–4 | 4 |
| Water | 0–6 | 1 |

In preparing the flux coating from the dry ingredients and binder, the binder is added to the mixture of dry ingredients, together with additional water as needed to obtain a consistency suitable for extrusion on the core wire. The flux coating can be applied to the core wire in any suitable manner, e.g., by an extrusion process and then dried on the wire surface by suitable drying and/or baking. This results in a hard adherent coating of high mechanical strength relatively free from impairment under normal handling conditions. A satisfactory drying or baking treatment of the flux and binder mixture comprises raising the temperature gradually up to about 600° F. (316° C.), and holding at that temperature for about 2 hours.

A flux coating formulation is shown in Table 4.

TABLE 4
FLUX COATING FORMULATION

| | Range | |
|---|---|---|
| Ingredient | Broad (%) | Preferred (%) |
| Calcium Carbonate | 10–50 | 28 |
| Cryolite | 10–50 | 28 |
| Titania | 5–35 | 9 |
| Silica | 0–30 | 3 |
| Wollastonite | 0–15 | 3 |
| *Chromium Metal | 5–20 | 10** |
| *Manganese Metal | 2–15 | 3** |
| *Molybdenum Metal | 0–8 | 4** |
| Nickel-Carbon Composite | 0–2 | 1 |
| Collodial Clays & Extrusion Aids | 0–8 | 3 |
| High Melting Oxides (e.g., MgO or ZrO$_2$) | 0–12 | 4 |
| *Columbium Metal | 0–8 | 4 |

*May be added as pure metals or in ferro-alloy form.
**Depends on form of material used. Number given is for pure metal.

Tensile results from longitudinal, all-weld-metal specimens of deposits of the two formulations are presented in Table 5. It should be appreciated that there appears to be very little difference in properties of the deposits of the two formulations.

TABLE 5
WELDING ELECTRODE 3/32" (.24 cm) & 1/8" (.32 cm) DIAMETERS; ALL-WELD-METAL SPECIMENS

| Test Temperature °F. (°C.) | Tensile Strength ksi (MPa) | Yield Strength ksi (MPa) | Elongation % | Reduction of Area % |
|---|---|---|---|---|
| Room Temperature | 119.4 (823) | 72.6 (500) | 34 | 26.8 |
| Room Temperature | 118.0 (813) | 75.0 (517) | 35 | 27 |
| Room Temperature | 118.7 (818) | 73.7 (508) | 34 | 28 |
| Room Temperature | 119.9 (827) | 73.7 (508) | 37 | 38 |
| 1000 (538) | 92.2 (636) | 55.4 (382) | 38.3 | 45.9 |
| 1200 (649) | 85.8 (591) | 51.6 (356) | 34.9 | 26.1 |
| 1400 (760) | 72.3 (498) | 55.1 (379) | 33.6 | 41.3 |
| 1600 (871) | 37.9 (261) | 36.5 (252) | 36.6 | 38.9 |
| 1800 (982) | 23.0 (158) | 22.8 (157) | 26.4 | 28.8 |
| 2000 (1093) | 12.7 (87.5) | 12.7 (87.5) | 12.8 | 23.3 |

WELDING ELECTRODE 5/32" (.41 cm) & 3/16" (.48 cm) DIAMETERS; ALL-WELD-METAL SPECIMENS

| Test Temperature °F. (°C.) | Tensile Strength ksi (MPa) | Yield Strength ksi (MPa) | Elongation % | Reduction of Area % |
|---|---|---|---|---|
| Room Temperature | 116.7 (804) | 72.5 (499) | 40 | 39.8 |
| Room Temperature | 118.7 (818) | 72.9 (503) | 39 | 35.7 |
| 1000 (538) | 92.1 (635) | 56.8 (391) | 40.0 | 44 |
| 1200 (649) | 89.3 (615) | 56.3 (388) | 38.0 | 45 |
| 1400 (760) | 75.2 (518) | 58.7 (405) | 23.6 | 19 |
| 1600 (871) | 45.5 (314) | 41.3 (285) | 28.0 | 31 |
| 1800 (982) | 24.7 (170) | 23.3 (161) | 33.0 | 36 |
| 2000 (1093) | 16.6 (114) | 16.6 (114) | 13.5 | 12.2 |

Results of stress rupture tests from the two formulations are presented in Table 6. As before, no consistent differences between the two formulations are evident. It should be observed that the stress to rupture the electrode is slightly less than that of the base metal at all temperatures except 1600° F. However, these differences are small. It is felt that the rupture strength of the electrode should be adequate for most applications. Joint efficiencies calculated from this data are presented in Table 7.

TABLE 6
STRESS RUPTURE DATA WELDING ELECTRODE 3/32" (.24 cm) & 1/8" (.32 cm) DIAMETERS; ALL-WELD-METAL SPECIMENS

| Test Temp. °F. (°C.) | Stress psi (MPa) | Rupture Life hrs. | Elongation % | Reduction of Area % |
|---|---|---|---|---|
| 1200 (649) | 58,000 (399) | 41.7 | 16.2 | 17.0 |
| | 50,000 (345) | 107.7 | 11.3 | 23.8 |
| 1400 (760) | 30,000 (206) | 21.0 | 15.2 | 18.3 |
| | 24,000 (165) | 81.8 | 0.2 | 10.7 |
| 1600 (871) | 13,000 (89.6) | 177.1 | 17.5 | 21.0 |
| | 13,000 (89.6) | 170.1 | 11.5 | 16.0 |
| | 13,000 (89.6) | 166.9 | 6.5 | 14.0 |
| | 9,700 (66.9) | 1036.3 | 9.3 | 13.8 |

TABLE 6-continued

| | | | | |
|---|---|---|---|---|
| | 9,600 (66.1) | 1137.2 | 5.8 | 8.3 |
| 1800 (982) | 5,900 (40.7) | 143.1 | 3.9 | 10.5 |
| | 4,300 (29.6) | 498.8 | 7.5 | 7.5 |
| 1832 (1000) | 3,000 (20.6) | 651.8 | 11.7 | 7.0 |
| | 5,000 (34.5) | 125.8 | 10.9 | 0.8 |
| | 5,000 (34.5) | 130.2 | 5.4 | 4.4 |
| 2000 (1093) | 2,700 (18.6) | 42.9 | 7.3 | 2.5 |
| | 1,800 (12.4) | 108.2 | 8.9 | 1.0 |

WELDING ELECTRODE 5/32" (.41 cm) &
3/16" (.48 cm) DIAMETERS; ALL-WELD-METAL SPECIMENS

| Test Temp. °F. (°C.) | Stress psi (MPa) | Rupture Life hrs. | Elongation % | Reduction of Area % |
|---|---|---|---|---|
| 1200 (649) | 58,000 (399) | 19.5 | 10.5 | 19.5 |
| | 50,000 (345) | 59.8 | 7.5 | 8.5 |
| | 47,000 (324) | 108.6 | 6.6 | 5.0 |
| | 42,000 (289) | 211.4 | 7.1 | 8.0 |
| 1400 (760) | 30,000 (306) | 24.0 | 11.6 | 7.0 |
| | 24,000 (165) | 95.3 | 10.1 | 14.5 |
| | 22,000 (152) | 148.8 | 7.4 | 7.0 |
| | 18,000 (124) | 594.0 | 2.6 | 2.5 |
| 1600 (871) | 13,000 (89.6) | 131.9 | 4.7 | 6.0 |
| | 13,000 (89.6) | 165.3 | 5.4 | 2.3 |
| | 9,700 (66.9) | 803.1 | 3.7 | 7.6 |
| | 8,500 (58.5) | 824.4 | 10.7 | 7.0 |
| 1800 (982) | 5,900 (40.7) | 75.2 | 5.7 | 3.3 |
| | 4,300 (29.6) | 324.3 | 6.3 | 3.0 |
| | 3,600 (24.8) | 509.0 | 6.1 | 1.5 |
| | 2,500 (17.2) | 1602.1 | 5.8 | 0.9 |
| 1832 (1000) | 3,000 (20.6) | 406.1 | 9.0 | 0.5 |
| | 5,000 (34.5) | 94.8 | 2.7 | 3.0 |
| 2000 (1093) | 2,700 (18.6) | 28.8 | 7.4 | 2.5 |
| | 1,800 (12.4) | 69.5 | 0.8 | 0.1 |
| | 1,500 (10.3) | 138.6 | 5.0 | 1.5 |
| | 1,000 (6.89) | 354.8 | 9.6 | 1.5 |

TABLE 7
CALCULATION OF JOINT EFFICIENCY

| | Stress to Rupture in 1000 hrs | | |
|---|---|---|---|
| Temp. °F. (°C.) | Welding Electrode psi (MPa) | INCONEL alloy 617 psi (MPa) | Joint Efficiency Weld in INCONEL alloy 617 |
| 1200 (649) | 40,000 (276) | 48,000 (331) | 83 |
| 1400 (760) | 17,500 (121) | 22,000 (151) | 80 |
| 1600 (871) | 8,600 (59.2) | 8,400 (57.9) | 102 |
| 1800 (982) | 3,400 (23.4) | 3,600 (24.8) | 94 |
| 2000 (1093) | 680 (4.68) | 1,500 (10.3) | 45 |

The stability of the deposit of the electrode is shown in Table 8. It is observed that while the weld material does show a loss of ductility and impact strength the loss is not of an extent that would render the weldment unserviceable.

TABLE 8
STABILITY DATA ROOM TEMPERATURE IMPACT STRENGTH (CVN) AFTER EXPOSURE TO VARIOUS ELEVATED TEMPERATURES

| | | Average Impact Strength | | |
|---|---|---|---|---|
| | | Weld Deposit | | Base Metal |
| Exposure Temperature °F. (°C.) | Exposure Time hrs | Small φ* Electrode ft/lb (J) | Large φ* Electrode ft/lb (J) | INCONEL alloy 617 ft/lb (J) |
| -As Welded- | | 39 (52) | 49 (66) | 187 (252) |
| 1200 (649) | 500 | 21 (28) | 27 (36) | 49 (66) |
| | 1000 | 20 (27) | 24 (32) | 40 (54) |
| | 2000 | 17 (23) | 20 (27) | 43 (58) |
| 1400 (760) | 500 | 16 (22) | 19 (26) | 64 (86) |
| | 1000 | 15 (20) | 17 (23) | 61 (82) |
| | 2000 | 15 (20) | 17 (23) | 55 (74) |
| 1625 (885) | 500 | 15 (20) | 23 (31) | 75 (101) |
| | 1000 | 17 (21) | 18 (24) | 65 (88) |
| 1800 (987) | 500 | 20 (27) | 21 (18) | N/A |

*Small Diameters - 3/32" & ⅛" (.24 & .32 cm)
*Large Diameters - 5/32" & 3/16" (.41 & .48 cm)

INCONEL alloy 617 derives much of its excellent oxidation resistance from the approximately 1% aluminum in its composition. However, very little of this aluminum will transfer across a welding arc during shielded metal arc welding. Thus, the weld deposits of the instant electrode normally contain less than 0.25% aluminum. For this reason, it was expected that the oxidation resistance of the weld deposits would be less than that of the wrought alloy. Indeed, this was found to be the case. Since it is impractical from an operability standpoint to add aluminum to the deposit via the coating, it is doubtful that the oxidation resistance of the deposit can be significantly increased without a major alloy composition change.

Accordingly, by adding manganese, chromium and columbium to the electrode coating, the oxidation resistance of the weld deposit is improved. Moreover by modifying the nickel-carbon composition of the flux, we have been able to improve the stress rupture characteristics of the weld deposit as well.

The physical characteristics of the experimental electrodes are presented in Table 10. The deposition efficiency values were calculated as follows:

$$\text{Deposition Efficiency} = \frac{\text{Weight of Metal Deposited From 1 Electrode}}{\text{Weight of 1 Electrode}} \times 100$$

where the "Weight of Metal Deposited" is defined as the weight of the deposit (with slag removed) from one electrode which was burned to a 2-inch (5.08 cm) stub. Thus, it is seen that from 10 pounds (4.5 kg) of 5/32-inch (0.41 cm) diameter electrodes, a welder will deposit approximately 6½ pounds (2.9 kg) of weld metal.

TABLE 10
PHYSICAL CHARACTERISTICS OF THE ELECTRODE

| Diameter | 3/32"(.24 cm) | 1/8"(.32 cm) | 5/32"(.41 cm) | 3/16"(.48 cm) |
|---|---|---|---|---|
| Length | 9"(22.8 cm) | 12"(30.5 cm) | 14"(35.6 cm) | 14"(35.6 cm) |
| Electrode/Pound (kg) | 41(91) | 16(35) | 9(20) | 7(15.5) |
| Die Size | .145"(.37 cm) | .200"(.5 cm) | .235"(.64 cm) | .270"(.67 cm) |
| *Deposition Efficiency (%) | 66 | 63 | 65 | 67 |
| Electrode Coating (%) | 24.5 | 29.0 | 24.5 | 21.3 |

*Calculated with 2" (5.08 cm) stub.

The recommended current ranges for the electrodes are presented in Table 11. These ranges were determined to be "optimum". Operating the electrodes below the minimum results in arc instability, poor wetting and trapped slag. Above the maximum amperage the welder may experience overheating, loss of arc stability and arc force, porosity and cracking.

TABLE 11
CURRENT RANGES WELDING ELECTRODE

| Electrode Diameter in. (cm) | Minimum* (Amps) | Maximum** (Amps) |
|---|---|---|
| 3/32 (.24) | 40 | 65 |
| ⅛ (.32) | 60 | 95 |
| 5/32 (.41) | 90 | 130 |
| 3/16 (.48) | 120 | 175 |

*Lowest amperage at which the electrode could be used with a reasonable amount of arc stability.
**Highest amperage at which the entire electrode (2-inch [5.08 cm] stub) could be used without overheating and loss of stability.

It is to be observed that the present invention provides a unique, flux-coated arc-welding electrode, containing a nickel alloy core of special composition for producing improved, sound, ductile welds having substantial freedom from hot cracking together with an easily removable slag. In the present invention substantial benefits are obtained by combining in special electrodes a columbium and manganese content together with a controlled aluminum content in the core wire of the electrode and further by incorporating it with the flux to provide an electrode which will produce satisfactory strong welds in joining or overlaying a variety of metals, especially in joining similar or dissimilar metals, and which will have improved arc stability and good slag characteristics and will deposit metal having good weld soundness and ductility and good freedom from hot cracking, and microfissuring. Furthermore, in accordance with the invention, the special electrodes hereinbefore described contain controlled amounts of the essential metals columbium and manganese together with a controlled aluminum content in the core wire. These new electrodes reduce weld porosity and hot weld cracking tendencies and further incorporate sufficient calcium carbonate in the flux to keep the carbon content of the weld low. The flux also contains a suitable binder material to produce a flux coating of high mechanical strength and a coating capable of rough handling without cracking and chipping.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A coated welding electrode having a core wire comprising about 22% chromium, about 12.5% cobalt, 9% molybdenum, about 1.2% aluminum, about 0.07% carbon, about 1.5% iron, about 0.5% silicon, about 0.5% manganese, about 0.008% sulfur, about 0.3% titanium, about 0.2% copper, the balance being nickel and a flux coating disposed about the electrode including about 10-50% calcium carbonate, about 10-50% cryolite, about 5-35% titania, up to 30% silica, up to 15% wollastonite, about 5-20% chrome, about 2-15% manganese, up to 8% molybdenum, up to 2% nickel-carbon composite, up to 8% colloidal clay, up to 12% high melting oxide, up to 8% columbium and a silicate type binder.

2. The electrode according to claim 1 wherein the flux coating comprises about 28% calcium carbonate, about 28% cryolite, about 9% titania, about 3% silica, about 3% wollastonite, about 10% chromium metal, about 3% manganese metal, about 4% molybdenum metal, about 1% nickel-carbon composite, about 3% collodial clays and extrusion aids, about 4% high melting oxides and about 4% columbium metal.

3. The electrode according to claim 1 wherein a weld deposit of the electrode includes about 0.1% carbon, about 1.4% manganese, about 1.2% iron, about 0.005% sulfur, about 0.5% silica, about 0.05% copper, about 23.1% chrome, about 0.2% aluminum, about 0.09% titanium, up to 0.001% magnesium, about 11.5% cobalt, about 9.2% molybdenum, about 0.5% columbium-tantalum, up to 0.002% boron, about 0.005% phosphorous, and the balance nickel.

4. The electrode according to claim 2 wherein the diameter of the electrode is less than or equal to ⅛ inch (0.32 centimeters).

5. The electrode according to claim 1 wherein a weld deposit of the electrode includes about 0.1% carbon, about 0.6% manganese, about 0.8% iron, about 0.004% sulfur, about 0.5% silicon, about 0.05% copper, about 23.2% chrome, about 0.2% aluminum, about 0.1% titanium, up to 0.001% magnesium, about 11.7% cobalt, about 9.3% molybdenum, about 0.02% columbium-tantalum, about 0.001% boron, about 0.005% phosphorous and the balance nickel.

6. The electrode according to claim 5 wherein the diameter of the electrode is greater than ⅛ inch (0.32 centimeters).

7. The electrode according to claim 1 wherein the binder comprises 40-98% sodium silicate, up to 50% potassium silicate, up to 4% lithium silicate and up to 6% water.

8. The electrode according to claim 7 wherein the binder comprises about 95% sodium silicate, about 4% lithium silicate and about 1% water.

* * * * *